United States Patent [19]

Berger et al.

[11] Patent Number: 5,185,223
[45] Date of Patent: Feb. 9, 1993

[54] NICKEL-CADMIUM STORAGE BATTERY WITH IMPROVED ELECTRICAL PROPERTIES

[75] Inventors: Gerhard Berger, Ebersbach; Gábor Benczür-Ürmössy, D-Stuttgart, both of Fed. Rep. of Germany

[73] Assignee: Deutsche Automobilgesellschaft mbH, Fed. Rep. of Germany

[21] Appl. No.: 691,732

[22] Filed: Apr. 26, 1991

[30] Foreign Application Priority Data

May 15, 1990 [DE] Fed. Rep. of Germany ....... 4015494

[51] Int. Cl.$^5$ .............................................. H01M 4/60
[52] U.S. Cl. .................................... 429/215; 429/223; 429/222; 429/198
[58] Field of Search ................ 429/223, 222, 215, 198

[56] References Cited

U.S. PATENT DOCUMENTS

| | | | |
|---|---|---|---|
| 2,870,234 | 1/1959 | Moulton | 429/221 |
| 2,934,581 | 11/1952 | Dassler | 429/222 |
| 3,837,919 | 9/1974 | Gutrdige | 429/222 |
| 3,918,990 | 11/1975 | Enters | |
| 4,405,700 | 9/1983 | Kampel | 429/248 |
| 4,471,038 | 9/1984 | Vyas | 429/198 |
| 4,990,414 | 2/1991 | Matsui et al. | 429/222 |

FOREIGN PATENT DOCUMENTS 1549588 8/1979 United Kingdom .

*Primary Examiner*—Asok Pal
*Assistant Examiner*—C. Everhart
*Attorney, Agent, or Firm*—Evenson, Wands, Edwards, Lenahan & McKeown

[57] ABSTRACT

An alkaline nickel-cadmium storage battery in which the active material with which the negative electrode is filled with, or the electrolyte in the storage battery, contains polyvinylpyrrolidone as an expander. Polyvinylpyrrolidone compounds having a mean molecular weight of 5,000 to 35,000 g/mol have proved particularly advantageous.

3 Claims, No Drawings

NICKEL-CADMIUM STORAGE BATTERY WITH IMPROVED ELECTRICAL PROPERTIES

BACKGROUND AND SUMMARY OF THE INVENTION

The invention relates to a nickel-cadmium storage battery with improved electrical properties, in which the active material with which the negative electrode is filled or the electrolyte in the storage battery contains polyvinylpyrrolidone as expander.

The cadmium electrode is used as a cathode almost exclusively in nickel-cadmium storage batteries. The nickel oxide electrode serves as positive electrode and an aqueous KOH solution as electrolyte. It has long been known that, like other negative electrodes, the cadmium electrode yields an adequate capacity during discharge only as a result of adding so called expanders (also call extenders). Without the addition of such expanders, a rapid drop in the capacity of the cadmium electrode occurs during cyclic charging and discharging, due to a coarsening of the crystals of the solid reactants Cd or $Cd(OH)_2$. The expanders counteract this process. That is, they keep the active constituents of the cadmium electrodes in a finely divided state.

Inorganic substances which, like Fe, $Fe_2O_3$, Ni or $Ni(OH)_2$, for example, have long been used extensively as expanders. Iron oxide is added to the cadmium active material, and iron or nickel is deposited together with the cadmium active material by simultaneous electrolysis. The nickel hydroxide can reach the cadmium electrode in several ways. In sintered and sintered foil electrodes it is produced by corrosion of the nickel framework. It can be deliberately introduced by impregnation with a nickel salt solution and subsequent precipitation with alkali (East German Patent Specification 12053). Furthermore, it can be added to the active material as nickel hydroxide powder (U.S. Pat. No. 3,870,562 and German Patent Specification 2,445,096) or introduced in the form of a suspension (V. A. Reshetov et al., "Journal Appl. Chem. USSR", 52 (1979), pages 548 ff., page 551). Some gastight nickel-cadmium storage batteries contain nickel hydroxide as an antipolar mass in the cadmium electrodes.

These additives have several known disadvantages. The iron and the iron oxides or hydroxides result in so-called iron poisoning of the positive electrode and, consequently, in a decrease in this capacity. In addition, the proportion, normally used (10 to 40% by weight of iron) reduces the capacity per unit weight of the cadmium electrode.

With nickel or nickel compounds, cadmium forms the intermetallic phase $Ni_5Cd_{21}$ which is discharged at a potential about 150 mV more anodic that cadmium. The extent of the phase formation depends on various parameters, such as temperature, electrolyte concentration and a particle size of the nickel or the nickel hydroxide. The amount of the phase formed increases with increasing temperature and decreasing particle size of the nickel or the nickel compound. Since more than four atoms of cadmium are bound, i.e. inactivated, per atom of nickel, the addition of larger amounts of nickel, nickel hydroxide or other nickel compounds is ruled out.

East german Patent Specification 12,053 describes the addition of 1% by weight of MgO or $Mg(OH)_2$ to the active cadmium material, which is also activated in addition with nickel sulphate. British Patent Specification 792,464 mentions, in addition to known substances, the addition of copper, copper oxide, cobalt, cobalt oxide, mercury and/or mercury oxide. A. Fleishcer, "Proc. 11th Ann. Battery Research and Development Conference" (1957), pages 83 ff., reports on the positive effects of indium on the capacity of the cadmium electrode, and O. C. Wagner, "J. Electrochem. Soc.", 116 (1969), pages 693 ff., reports on the use of 5–10% by weight of $TiO_2$ instead of $Fe_2O_3$ in cadmium electrodes.

Certain organic compounds have proved more suitable as expanders than the above substances because they need be added in amounts of only up to about 1% by weight to the active cadmium material. According to the teaching of U.S. Pat. No. 2,802,043, alkali-soluble cellulose derivatives—particularly carboxymethylcellulose (CMC)—are suitable. Associated with the electrolyte solubility is, however, a disadvantage, the CMC being oxidized at the positive electrode. With increasing operating time, the CMC disappears, and instead, carbonate accumulates as an oxidation product in the electrolyte, which has a known adverse effect on the capacity of the cadmium electrode.

Polyvinyl alcohol, which is used fairly often as an additive to cadmium electrodes, must be regarded more as a binder than as an expander. According to the teaching of U.S. Pat. No. 4,471,038, the addition of polybenzimidazole, polybenzothiazole and polybenzoxazole to the electrolyte or to the cadmium electrode of Ni/Cd storage batteries is beneficial for increasing the capacity or the cadmium utilization of the electrode. S. Sathyanarayana "J. Appl. Elektrochem.", 15 (1985), pages 453 ff., reports the unusually high cadmium utilization of 96±2% on addition ethylcellulose to sintered nickel electrodes. According to our investigations, however, the ethylcellulose does not have any expanding action.

Ceratin pyrazolone derivatives were investigated by M. G. Mikhalenko et al., J. Appl. Chem. USSR", 49 (1976), pages 2022 ff. as expanding additives. A disadvantage cited is that, in the initial cycles, the cathodic reduction of CdO partly takes place only in the overcharging phase during the hydrogen evolution. The electrodes are compared with those which contain "solar oil" as expanding additive. P. V. Vasudeva Rao et al., "J. Power Sources", 1 (1976), pages 81 ff., reports on increased cadmium utilization on adding tetraalkylammonium compounds, particularly at discharge rates between 1° C. and 10° C.

According to the teaching of U.S. Pat. No. 2,870,234 and German Patent Specification 1,063,665, polyvinylpyrrolidone is suitable as an expander in cadmium electrodes. An addition of about 1% by weight, based on the active cadmium material, is specified. When the active cadmium material specified in these documents is used for the negative electrodes of alkaline nickel-cadmium storage batteries, however, it has been found that the storage batteries sometimes malfunction, and there is not an adequate cadmium utilization.

The object of the present invention, therefore, is to provide an alkaline nickel-cadmium storage battery, in which polyvinylpyrrolidones having a particular characteristic are added as an expander to the active material with which the negative electrode is filled or to the electrolyte in the storage battery, so that the abovementioned disadvantages no longer occur.

Another object of the invention is to provide a storage battery that has a good charge acceptance, with a low dosage of added polyvinylpyrrolidone in terms of weight.

These and other objects and advantages are achieved, according to the invention, by the addition of the polyvinylpyrrolidone compound, either to the aqueous active material paste, or as an aqueous solution to the electrolyte.

DETAILED DESCRIPTION OF THE INVENTION

To test the expanding action of the added polyvinylpyrrolidone compound, the cadmium electrodes were operated in a half-cell arrangement with an excess of electrolyte and inert nickel sheets and counterelectrodes. A mixture of 4M KOH+0.4M LiOH was most often used as an electrolyte, and the Hg/HgO electrode was used as a reference electrode in the same electrolyte. The electrodes usually had a size of 7 cm×7 cm=49 cm$^2$. The thickness varied between 0.8 mm and 3.5 mm, with electrodes having a thickness of 2.5 mm being investigated most frequently. The expansion effectiveness was assessed by determining the cadmium utilization at various discharge current densities, the latter being between 12 mA/cm$^2$ (0.6A) and 600 mA/cm$^2$ (approximately 30A). An initial selection of the substances tested for expanding action can be determined even after a few cycles, particularly in the case of a discharge with current densities of 200 mA/cm$^2$ and above. The cadmium electrodes containing a promising expander additive were investigated in continuous test over a few hundred cycles. In these tests, the electrodes were operated at low current densities. After 100 cycles in each case, the determination of cadmium utilization at high discharge rates was repeated.

Four types of PVP (BASF) were available for investigating the expansion effectiveness, as follows:

| Type | Mean molecular weight/g · mol$^{-1}$ |
|---|---|
| Kollidon 12 PF | 2.500 |
| Kollidon 17 | 11.500 |
| Luviskol K 30 | 40.000 |
| Luviskol K 90 | 900.000 |

Mean molecular weight hereinafter denotes the weight average of the molecular weight. The values for the molecular weight were taken from the relevant product information provided by the manufacturer.

Surprisingly, a test of cadmium electrodes containing various types of PVP showed that the expanding action of the PVP —assuming an equal content—depends on the mean molecular weight of the type used. Electrodes containing 0.16% by weight and 0.32% by weight of PVP were tested first. Of the four PVP types only Kollidon 17 exhibits a good expanding action. In these amounts, our tests showed that Luviskol K 90 exhibits no expanding action, and the action of Luviskol K 30 is moderate. Electrodes containing Kollidon 12 PF exhibit considerable disturbances in the charge acceptance which are manifested in a potential step, premature changeover to hydrogen evolution and/or oscillations in potential, which is described as overexpansion. Associated with this is a poor cadmium utilization. The observations justify the conclusion that it is not the amount by weight of the PVP used, but rather the molar amount which is decisive for the expanding action. Expressed in other words: it is not the total number of monomer units in the polymer which is decisive, but the number of polymer molecules.

A critical PVP/CdO molar ratio of about $4.10^{-5}$ was found for the operation of cadmium electrodes in 4M KOH+0.4M LiOH. This makes it possible to predict the maximum quantities of PVP of different molecular weight with which the cadmium electrodes can be cycled without overexpansion symptoms. In order to achieve approximately equal expanding action, with increasing molecular weight of the PVP, increasing amounts also have to be used. In the table below, the maximum values calculated from the critical molar ratio are given for the types of PVP used.

| Type | g of PVP/100 g of CdO |
|---|---|
| Kollidon 12 PF | 0.1 |
| Kollidon 17 | 0.5 |
| Luviskol K 30 | 1.6 |
| Luviskol K 90 | 36.0 |

Owing to the large amount to be used, Luviskol K 90 was not tested further. Of the three other types, about two-thirds of the maximum amount was introduced into cadmium electrodes to test the expanding action. In 4M KOH+0.4M LiOH, electrodes containing 0.07% by weight of Kollidon 12, 0.32% by weight of Kollidon 17 and 1.0% by weight of Luviskol K 30 exhibited under comparable conditions approximately equal cadmium utilization; for example, approximately 3% of theory at 400 mA/cm$^2$, in the initial cycles.

Kollidon 17 has proven to be particularly advantageous. A low dosage of about 0.2 to 0.3% by weight, based on the active cadmium material, is accompanied by a long-lasting expanding action over hundreds of cycles. In addition, oxidation of the PVP resulted in a lower carbonatization of the electrolyte than corresponds to the prior art. In alkaline electrolytes, PVP is subject to slow hydrolysis to poly-δ-aminobutyric acid which, as a consequence of its electrolyte solubility, is subject to oxidation at the positive electrode. The amount of the Kollidon 12 is too small to ensure an adequate cadmium utilization over a prolonged period. Similar results can in fact be achieved with Luviskol K 30 as with Kollidon 17, but only with an amount of about 1% by weight, based on the active material. In addition to the higher dosage, the markedly higher carbonatization of the electrolyte during oxidation is also a disadvantage.

The action of the PVP is intensified in a surprising way by the addition of metal oxide/hydroxides. The combination is far more effective than the individual additives alone; that is, there is a synergistic effect. It was found that the combined addition keeps the capacity of the cadmium electrode at a high level over hundreds of cycles at a wide range of current densities corresponding to complete discharges of a few hours to a few minutes.

The expanding action of PVP without utilizing the synergistic effect stabilizes the capacity of the cadmium electrode at a somewhat lower level. The action of the inorganic oxides and hydroxides, including Ni(OH)$_2$, decreases markedly with the cycle time. The most effective way of introducing nickel hydroxide is by impregnation of the negative paste material with a nickel sulphate solution, and subsequent precipitation on adding electrolyte. The oxides and hydroxides of Ni, Mg and Ti, and also the Ni salt of 1-hydroxyethane-1, 1- diphosphonic acid, can be incorporated in the cadmium oxide paste.

A good expanding action is also achieved with poly-N-vinyllactams of the poly-N-vinylpyrrolidone type. The poly-N-vinylcaprolactams having the same degree of polymerisation as Kollidon 17 exhibit the same action as the PVP compounds. Alkylated types of PVP such as, for example, the Antaron V types (GAF) are also effective. They have the disadvantage, however, that they have to be introduced in very much larger amounts, and are only soluble in organic solvents.

The nickel-cadmium storage batteries according to the invention preferably have fibrous framework electrodes which are filled with the active cadmium material. The storage batteries may, however, also be provided with other types of electrode, for example with pocket-type plate electrodes or sintered or sintered foil electrodes.

The subject of the invention will also be illustrated with reference to the following examples:

EXAMPLE 1

A nickel fibrous framework having a size of 7 cm×7 cm and a thickness of 2.4 mm, and provided with a current collector was filled with aqueous cadmium oxide paste which had a Kollidon 17 content of 0.32% by weight, based on the cadmium oxide. The dried electrode contained 20.18 g of CdO, which corresponds to a theoretical capacity of 8.42 Ah. The electrode was placed in a vessel containing 550 ml of 4M KOH+0.4 LiOH. Two perforated nickel sheets served as counterelectrodes and the reference electrode was an Hg/HgO electrode in the same electrolyte. The first charging took place at a potential, displaced somewhat in the cathodic direction with respect to the $Cd/Cd(OH)_2$ equilibrium potential, of about $-1,000$ mV against Hg/HgO. After switching on the current, the potential fell for a short time to $-1,090$ mV (Hg/HgO); the electrode was discharged to $-800$ mV (Hg/HgO). All subsequent chargings took place in the vicinity of the equilibrium potential mentioned, specifically at about $-940$ mV against Hg/HgO. The current density during charging and discharging was 25 mA/cm$^2$, just as in the other examples. In the tenth cycle, the electrode yielded a capacity of 2.78 Ah at 400 mA/cm$^2$ and with a final discharge potential of $-500$ mV against Hg/HgO; this corresponds to a cadmium utilization of 33% of theory.

A comparison electrode of the same size, which contained 19.15 g of CdO (corresponding to a theoretical capacity of 7.99 Ah), was impregnated with 0.32% by weight of Kollidon 12 PF, based on CdO, by means of an aqueous solution. The dried electrode was arranged and operated in the same way as the electrode described above. The first charging took place with hydrogen evolution in a range of potential between $-1,140$ mV and $-1,170$ mV against Hg/HgO, and a charge of 8.13 Ah was introduced. The cathodic reduction of the cadmium oxide was incomplete under these circumstances. Although the next chargings began at about $-940$ mV (Hg/HgO), they were accompanied by constant potential variations both in the cathodic and in the anodic direction. The reduction of the cadmium oxide was complete only after 11 cycles, as was visible from the grey coloration of the electrode. In the 12th cycle, the electrode yielded a capacity of 2.0 Ah at a discharge current density of 400 mA/cm$^2$ and with a final discharge potential of $-500$ mV (Hg/HgO), corresponding to a cadmium utilization of 25% of theory.

EXAMPLE 2

A nickel fibrous framework electrode having a thickness of 2.45 mm and an active area of 7×7 cm$^2$ and provided with a current collector contained 20.71 g of CdO and 0.16% by weight of Kollidon 17, based on CdO. The cadmium oxide and the Kollidon 17 were introduced into the fibrous framework as an aqueous paste. The theoretical electrode capacity was 8.64 Ah. The cadmium electrode and two counterelectrodes made of perforated nickel sheets were incorporated in a half-cell arrangement in a vessel into which 550 ml of 4M KOH+0.4M LiOH were introduced, and an Hg/HgO reference electrode containing the same electrolyte was incorporated in a Haber-Luggin capillary. The first charging took place at $-1,000$ mV against Hg/HgO and the subsequent ones at about $-940$mV against Hg/HgO. The electrode yielded a capacity in the 8th cycle of 2.64 Ah, which corresponds to a cadmium utilization of 30.5% of theory, at 400 mA/cm$^2$ and with a final discharge potential of $-500$ mV (Hg/HgO).

A comparison electrode having a thickness of 2.3 mm and an active area of 7×7 cm$^2$ contained 18.56 g of CdO, which corresponds to a theoretical capacity of 7.74 Ah. A content of Luviskol K 30 of 0.16% by weight, based on CdO, was introduced into the dry electrode by impregnation with an aqueous solution. The dry electrode was combined in the normal manner with perforated nickel sheets and an Hg/HgO reference electrode to form a half-cell. The electrolyte was again 4M KOH+0.4M LiOH. The first and the subsequent chargings took place in the potential range from $-940$ mV to $-950$ mV (Hg/HgO). After the current was first switched on, a potential of $-1,050$ mV against Hg/HgO was established for seconds. In the 9th cycle, the electrode yielded a capacity of 1.48 Ah at 400 mA/cm$^2$ and with a switch-off potential of $-500$ mV (Hg/HgO), corresponding to a cadmium utilization of 19.1% of theory.

The preferred way of adding in the expander is by direct addition to the aqueous cadmium oxide paste or by impregnation of the finished electrode framework with an aqueous expander solution. It may, however, sometimes be expedient to add the expander to the electrolytes of the cell; for example if impregnation is not possible or if the consumed expander which has been altered chemically by oxidation and hydrolysis and is consequently ineffective is to be replaced by addition of fresh expander (so-called post-expansion).

EXAMPLE 3

In a comparison experiment, two electrode frameworks (nickel fibrous framework, size 7×7 cm$^2$, thickness 2.4 mm) were filled with aqueous cadmium oxide paste. The theoretical capacity was calculated from the increase in weight of the dried electrode framework. Both electrodes were cycled separately in a half-cell arrangement in 4M KOH+0.4M LiOH. An aqueous solution of 0.2 g of Kollidon 17 (about 0.8%, based on CdO) in 5 ml of water was added while stirring to the electrolyte of one electrode, which yielded a milky turbid emulsion.

After 7 forming cycles, the effect of the expander was tested by high-current discharge at 600 mA/cm$^2$ (30A). The additive-free electrode exhibited a utilization of only 9% of theory. The electrode containing the Kollidon 17 added to the electrolyte yielded 24% of the theoretically possible capacity. Equally marked was the difference between the two electrodes with a 25 mA/cm$^2$ loading after 14 cycles: 44% utilization without expander and 71.5% with Kollidon 17 added to the electrolyte, respectively.

The advantages achieved according to the invention are, in particular, that there is a good charge acceptance in the nickel-cadmium storage battery, no malfunctions occur during charging and there is good cadmium utilization.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Nickel-cadmium storage battery with improved electrical properties, in which one of: an active material with which a negative electrode of said storage battery is filled, and an electrolyte in the storage battery, contains polyvinyl-pyrrolidone as an expander, wherein said polyvinyl-pyrrolidone has a mean molecular weight of between 5,000 and 35,000 g/mol, and its proportion is 0.1 to 0.8% by weight, based on active cadmium material.

2. Nickel-cadmium storage battery according to claim 1 wherein polyvinylpyrrolidone having a mean molecular weight of between 8,000 and 28,000 g/mol is used and the proportion is 0.2 and 0.5% by weight, based on the active cadmium material.

3. Nickel-cadmium storage battery according to claim 1 wherein a substance, being 0.5 to 4 mol-% of at least one of: oxides and hydroxides of nickel, magnesium and titanium, based on the active cadmium material, are additionally added to the active material of the electrode.

* * * * *